(12) United States Patent
Allison

(10) Patent No.: US 11,162,533 B2
(45) Date of Patent: Nov. 2, 2021

(54) ROLLING BEARING

(71) Applicant: Aktiebolaget SKF, Gothenburg (SE)

(72) Inventor: Bryan Allison, Jamestown, NY (US)

(73) Assignee: AKTIEBOLAGET SKF, Gothenburg (SE)

( * ) Notice: Subject to any disclaimer, the term of this patent is extended or adjusted under 35 U.S.C. 154(b) by 265 days.

(21) Appl. No.: 16/166,208

(22) Filed: Oct. 22, 2018

(65) Prior Publication Data

US 2020/0124100 A1 Apr. 23, 2020

(51) Int. Cl.
*F16C 33/38* (2006.01)
*F16C 19/06* (2006.01)
*F16C 33/44* (2006.01)

(52) U.S. Cl.
CPC .......... *F16C 33/3887* (2013.01); *F16C 19/06* (2013.01); *F16C 33/3856* (2013.01); *F16C 33/44* (2013.01); *F16C 2208/02* (2013.01)

(58) Field of Classification Search
CPC .............. F16C 33/4617; F16C 33/4623; F16C 33/4635; F16C 33/56; F16C 33/62; F16C 33/3887
See application file for complete search history.

(56) References Cited

U.S. PATENT DOCUMENTS

| | | | |
|---|---|---|---|
| 4,004,952 A * | 1/1977 | Jatczak | C22C 38/12 148/319 |
| 4,744,679 A | 5/1988 | Verburg et al. | |
| 5,165,804 A | 11/1992 | Fisher et al. | |
| 5,180,231 A * | 1/1993 | Ueno | F16C 19/20 384/527 |
| 5,328,277 A | 7/1994 | Moulton | |
| 5,589,011 A * | 12/1996 | Gonsalves | B22F 1/0018 148/325 |
| 6,315,456 B1 | 11/2001 | Tanimoto et al. | |
| 7,766,553 B2 * | 8/2010 | Nagai | F16C 33/3856 384/523 |
| 8,523,450 B2 * | 9/2013 | Maejima | F16C 33/416 384/523 |
| 2003/0063825 A1 | 4/2003 | Ooitsu et al. | |
| 2016/0223019 A1 | 8/2016 | Yamamoto et al. | |

FOREIGN PATENT DOCUMENTS

| | | | |
|---|---|---|---|
| JP | H10205541 A | 8/1998 | |
| JP | 2004316813 A | 11/2004 | |
| JP | 2014020490 A | 2/2014 | |

OTHER PUBLICATIONS

NetComposites volume-weight fraction calculator, print-outs obtained Jul. 15, 2019.*

(Continued)

*Primary Examiner* — James Pilkington
(74) *Attorney, Agent, or Firm* — J-Tek Law PLLC; Scott T. Wakeman; Mark A. Ussai

(57) ABSTRACT

A rolling bearing is disclosed which comprises an outer ring and an inner ring, wherein rolling elements are arranged between the outer ring and the inner ring, and wherein the rolling elements are spaced apart by a cage being arranged between the outer ring and the inner ring, wherein the cage is made of polymer containing reinforcing fibers, and the outer ring and/or the inner ring are steel rings with fine carbide precipitation.

8 Claims, 1 Drawing Sheet

(56) References Cited

OTHER PUBLICATIONS

AutoDrill, Hardness Scale for Various Materials, pp. 1-3, published at http://www.drill-hq.com/2011/11/hardness-scale-for-various-materials/ on Nov. 21, 2011.*
"Carburizing", Wikipedia, pp. 1-4, obtained Oct. 24, 2019.*
Brecher et al. ;"Cage Friction in High-Speed Spindle Bearings"; Laboratory for Machine Tools and Production Engineering (WZL) of RWTH Aachen University52074 Aachen, Germany; Tribology Transactions. 57. 10.1080/10402004.2013.843738. ISSN: 1040-2004 print / 1547-397X online.
Allison, Bryan, PhD; "Tribological Testing of PEEK for Aerospace Applications"; presented at the AHS 72nd Annual Forum, West Palm Beach, Florida, USA, May 17-19, 2016. Copyright © 2016 by the American Helicopter Society International, Inc.
European Search Report from the European Patent Office dated Mar. 24, 2020 in related application No. EP 19 20 0115, including European Search Opinion.

* cited by examiner

ROLLING BEARING

TECHNOLOGICAL FIELD

The present invention relates to a rolling bearing comprising an outer ring and an inner ring, wherein rolling elements are arranged between the outer ring and the inner ring, and wherein the rolling elements are spaced apart by a cage being arranged between the outer ring and the inner ring.

BACKGROUND

Rolling element bearings typically utilize a cage being arranged between the inner ring and the outer ring. The cage serves to separate the rolling elements and keep them aligned and uniformly separated, wherein a small radial clearance typically exists between the cage and the rings. However, in this clearance, contamination with hard particles may occur which can damage the cage and/or the rings. The hard particles may be either introduced from the outside, or, for example when using steel with fine carbides as material for the rings, may originate from the steel itself.

When using a steel cage, the cage may be covered with a relatively soft silver plating, which is used to reduce friction and act as a sacrificial lubricant. However, the hard particles in the clearance may get captured in the silver plating that is applied to the steel cage as the silver plating is relatively soft and can capture the hard particles. The captured hard particles then stick out of the surface of the silver plating as the particles may not sink in due to the harder steel layer of the cage beneath the silver plating.

The hard particles, which stick out, may create excessive wear on the rings during a continued sliding contact when using the bearing. This may be especially a problem for rings made out of steels that contain only fine carbides. These fine carbides do not provide sufficient wear resistance to the material to resist the abrasive sliding wear when hard particles become captured in the cage material.

Current bearings resolve the issue described above by applying a ceramic coating to the region of the ring contacting the cage, when a steel with fine carbides is used for the rings. Such a ceramic coating is hard enough so that contamination particles cannot impact the rings. However, such a ceramic coating is expensive in terms of manufacturing costs and special tools are needed for applying the coating.

It is thus an object of the present invention to provide a rolling bearing which has fine carbide rings and which is wear resistant in the case of hard particles contamination within a contact region between the rings and a cage used in the rolling bearing.

SUMMARY

The rolling bearing comprises an outer ring and an inner ring, wherein rolling elements are arranged between the outer ring and the inner ring, and wherein the rolling elements are spaced apart by a cage being arranged between the outer ring and the inner ring. The outer ring and/or the inner ring may be made of fine carbide precipitate steel offering increased performance compared to standard steels used in bearings.

These steel rings are case carburized which leaves a very low amount of carbon (and thus low hardness) in the core of the material, but a substantial amount near the surface of the part. This is desirable compared to traditional through hardened steels because the low carbon in the core may increase the ring resistance to impact loads and allows for higher press fits which in turn allows for higher operational speeds and temperatures, while a combination of the relatively small carbides and residual stresses formed near the surface result in longer rolling contact fatigue life compared to through hardened steels.

The cage may contact the inner and/or outer ring in order to be guided by the rings. As de-scribed above, usually fine carbide precipitate steel rings may need an additional ceramic coating for protecting the surface of the rings against hard particles being present in the contact region between the rings and the cage. In order to avoid such an additional ceramic coating and the associated costs thereof, the described rolling bearing uses a polymer cage containing a high amount of reinforcing fibers instead of using a steel cage with a silver plating as described above.

Until now, the silver plating was used for cages to reduce friction between the cage and the rings, wherein the silver plating acted as a sacrificial lubricant. However, in the case of hard particles contamination in the contact region between the cage and the rings, these hard particles were captured by the soft silver plating. The particles stick out of the silver plating as they cannot sink into the cage surface due to the hard steel surface beneath the silver plating.

This may be avoided by using a polymer cage having a high amount of reinforcing fibers. In particular, the polymer contains more than 15% volume fraction of reinforcing fibers, in particular between 15% and 20% volume fraction of reinforcing fibers.

As described in the following in greater detail, such a polymer cage does not capture hard particles or at least captures only a reduced number of hard particles, which may be present in the contact region between the cage and the rings.

This is due to the fact that, when contacting the surface of the polymer cage, hard particles may get in contact with the reinforcing fibers. As the reinforcing fibers are at the surface of the cage surface and are harder than the hard particles, the particles will not be able to enter into the surface of the polymer cage and may slide on the surface of the cage out of the contact region between cage and rings.

When getting in contact with the surface of the polymer cage aside of the reinforcing fibers but in an area of the softer polymer material, the hard particles may enter the surface of the polymer cage. However, due to the soft polymer material, the hard particles may completely sink into the surface of the polymer cage, beneath the reinforcing fibers, and may be embedded within the polymer material. Consequently, as the hard particles are completely embedded in the polymer material, they do not stick out and are not able to damage the rings in the contact region between cage and rings.

In the unlikely case that hard particles are neither repelled by the reinforcing fibers nor embedded by the polymer material, the hard particles may be captured by the surface of the polymer cage and may stick out as explained above. However, the amount of the particles still sticking out of the cage surface is highly reduced compared to a cage with silver plating as described above.

Generally, the use of a polymer cage provides further benefits as polymer cages are more robust, easier to manufacture and have a better corrosion resistance compared to steel cages. The use of reinforcing fibers may contribute to the chemical resistance, wear resistance and high temperature stability of the polymer cage.

In a further embodiment, the hardness of the polymer cage may be overall comparable to the hardness of the silver-plated steel cage currently used, which is about 100 HB. Preferably, the average hardness of the cage may be obtained by combining a softer polymer matrix with much harder fibers.

According to a further embodiment, reinforcing fibers are used which are ten times harder than the steel rings. This may be preferred as such fibers may be particularly suitable to resist the hard contamination particles as described above. In particular, the reinforcing fibers are carbon fibers, glass fibers or steel fibers.

In one embodiment, the polymer matrix may have a hardness of preferably about 35 HB, wherein the reinforcing fibers may have a hardness of preferably about 1000 HB. This re-sults in an overall hardness of roughly 100 HB.

According to a further embodiment, the polymer used for the cage may be polyether ether ketone (PEEK). PEEK cages are not susceptible to corrosion in contrast to steel cages.

Further advantages and preferred embodiments are disclosed in the claims, the description and the figures. It should be further noted that a person skilled in the art may regard or use the presented features individually or combine the presented features otherwise than indi-cated without extending the scope of the invention.

BRIEF DESCRIPTION OF THE DRAWINGS

In the following, the present invention will be described by means of embodiments shown in the figures. The shown embodiments are exemplarily, only, and are not intended to limit the scope of protection. The scope of protection is solely defined by the attached claims.

DETAILED DESCRIPTION

Figure 1:
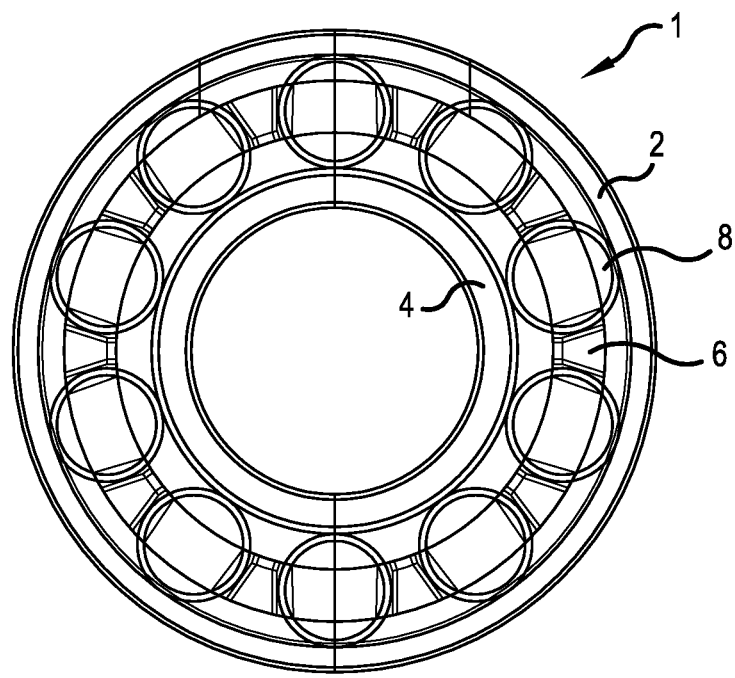
FIG. 1 shows a top view of a rolling bearing.

In the following same or similar functioning elements are indicated with the same reference numerals.

Figure 2:
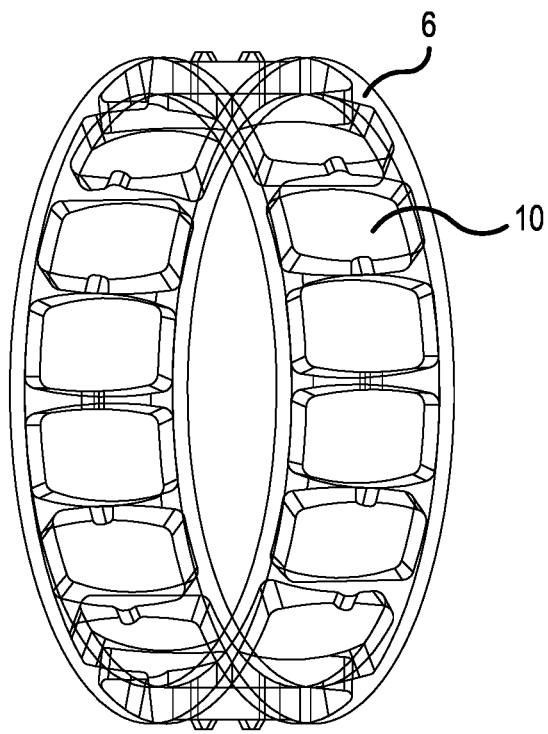
FIG. 2 shows a perspective view of a polymer cage used in the rolling bearing of FIG. 1.

FIG. 1 shows a rolling bearing 1 comprising an outer ring 2 and an inner ring 4. Between the outer ring 2 and the inner ring 4, a cage 6 is arranged for guiding rolling elements 8 and for holding them spaced apart. As shown in FIG. 2, the cage 6 comprises openings 10 which form pockets for receiving the rolling elements 8, in this case balls. However, any other kind of rolling elements 8 may be used.

In the contact region between the rings 2, 4 and the cage 6, contamination with hard particles may occur. These hard particles may originate from the rings 2, 4, in particular when the outer ring 2 and/or the inner ring 4 are steel rings with fine carbide precipitation.

In previous bearings, steel cages with silver plating were used, wherein the silver plating served as a friction reducing and lubricating layer. However, the silver plating is a very soft layer in which hard particles may be captured. When the particles are captured in the silver plating, they typically stick out of the surface of the cage, in particular the silver plating, and may damage the surfaces of the rings 2, 4 in the contact region between the cage 6 and the rings 2, 4.

In order to avoid or at least reduce such capturing of hard particles, a polymer cage 6, in particular a PEEK cage, with a high amount of reinforcing fibers is used in the herein described rolling bearing 1. The reinforcing fibers may be for example carbon fibers. Such a polymer cage 6 provides the following advantages.

Hard particles in the contact region between the cage 6 and the rings 2, 4 may contact the reinforcing fibers which are harder than the hard particles. As a consequence, the hard particles are not able to penetrate the surface of the polymer cage 6 and will slip away out of the contact region. Thus, these particles will not damage the surface of the rings 2, 4.

If the hard particles contact the polymer cage 6 not in an area of reinforcing fibers but at an area where the polymer material is at the surface of the cage 6, the hard particles may penetrate the surface of the polymer cage 6. However, due to the soft polymer material, the hard particles will completely enter into the polymer and will be embedded in the polymer cage 6. Thus, none of these particles will stick out of the surface of the cage 6 and will also not damage the surface of the rings 2, 4.

It may be the case that some of the hard particles will neither slip away due to a contact with the reinforcing fibers nor will be embedded in the polymer material. These particles may stick out of the surface of the cage 6 and may get in contact with the rings 2, 4. However, the number of these particles will be significantly reduced compared to the number of particles which would be captured in a silver-plated cage.

Thus, by providing a rolling bearing having a polymer cage having a high amount of reinforcing fibers, the contamination with hard particles in the surface of the cage may be reduced.

REFERENCE NUMERALS 1 rolling bearing
2 outer ring
4 inner ring
6 cage
8 rolling elements
10 pockets

What is claimed is:

1. A rolling bearing comprising:
an outer ring and an inner ring, wherein the outer ring and/or the inner ring is formed from a steel with carbide precipitation,
a bearing cage between the inner ring and the outer ring; and
a plurality of rolling elements retained by the cage, the cage maintaining a spacing of the plurality of rolling elements;
wherein the cage comprises reinforcing fibers in a polymer matrix, and
wherein particles of the steel are completely embedded in the polymer matrix.

2. The rolling bearing according to claim 1, wherein the cage contains more than 15% volume fraction of the reinforcing fibers.

3. The rolling bearing according to claim 1, wherein the polymer matrix has a hardness of about 35 HB and the reinforcing fibers have a hardness of about 1000 HB.

4. The rolling bearing according to claim 1, wherein the polymer is polyether ether ketone.

5. The rolling bearing according to claim 1, wherein the reinforcing fibers are carbon fibers or glass fibers or steel fibers.

6. The rolling bearing according to claim 1, wherein the reinforcing fibers are steel fibers.

7. A rolling bearing comprising:
an outer ring formed from a steel with carbide precipitation;
an inner ring formed from the steel, a bearing cage between the inner ring and the outer ring; and a plurality of rolling elements retained by the cage, the cage maintaining a spacing of the plurality of rolling elements;

wherein the cage is formed of polyether ether ketone containing reinforcing fibers, the reinforcing fibers having a hardness of about 1000 HB, wherein the cage includes particles of the steel completely embedded in the polyether ether ketone, wherein the polymer contains more than 15% volume fraction of the reinforcing fibers, and wherein the reinforcing fibers are carbon fibers or glass fibers or steel fibers.

8. The rolling bearing according to claim 7, wherein the reinforcing fibers are the steel fibers.

* * * * *